(12) United States Patent
Halmos

(10) Patent No.: US 8,947,644 B2
(45) Date of Patent: Feb. 3, 2015

(54) USING MULTIPLE WAVEFORMS FROM A COHERENT LADAR FOR TARGET ACQUISITION

(75) Inventor: Maurice J. Halmos, Encino, CA (US)

(73) Assignee: Raytheon Company, Waltham, MA (US)

( * ) Notice: Subject to any disclaimer, the term of this patent is extended or adjusted under 35 U.S.C. 154(b) by 363 days.

(21) Appl. No.: 13/353,854

(22) Filed: Jan. 19, 2012

(65) Prior Publication Data

US 2013/0188167 A1 Jul. 25, 2013

(51) Int. Cl.
*G01C 3/08* (2006.01)

(52) U.S. Cl.
USPC ............ 356/4.01; 356/3.01; 356/3.1; 356/4.1

(58) Field of Classification Search
USPC ............ 356/3.01–3.15, 4.01–4.1, 5.01–5.15, 356/6–22, 28, 28.5
See application file for complete search history.

(56) References Cited

U.S. PATENT DOCUMENTS

| | | |
|---|---|---|
| 3,790,278 A | 2/1974 | Buczek et al. |
| 4,743,110 A | 5/1988 | Arnaud et al. |
| 4,959,800 A | 9/1990 | Woolley |
| 4,968,968 A | 11/1990 | Taylor |
| 5,289,252 A | 2/1994 | Nourrcier |
| 5,398,130 A | 3/1995 | Redman |
| 5,623,267 A | 4/1997 | Wurman |
| 5,847,816 A | 12/1998 | Zediker et al. |
| 6,259,803 B1 | 7/2001 | Wirtz et al. |
| 6,388,739 B1 | 5/2002 | Rice |
| 6,545,785 B1 | 4/2003 | Heflinger et al. |
| 6,559,932 B1 | 5/2003 | Halmos |
| 6,614,386 B1 | 9/2003 | Moore et al. |
| 6,823,033 B2 | 11/2004 | Fahim |
| 6,875,978 B2 | 4/2005 | Halmos |
| 6,885,299 B2 | 4/2005 | Cooper et al. |
| 7,239,777 B1 | 7/2007 | Christensen et al. |
| 7,345,744 B2 | 3/2008 | Halmos et al. |
| 7,414,706 B2 | 8/2008 | Nichols et al. |
| 7,495,994 B2 | 2/2009 | Makris et al. |
| 7,505,488 B2 | 3/2009 | Halmos |
| 7,545,312 B2 | 6/2009 | Kiang et al. |

(Continued)

FOREIGN PATENT DOCUMENTS

| | | |
|---|---|---|
| EP | 1 542 036 | 6/2005 |
| FR | 2 519 771 | 7/1983 |

(Continued)

OTHER PUBLICATIONS

A.L. Kachelmyer, Range-Doppler Imaging: Waveforms and Receiver Design, Massachusetts Institute of Technology, Lincoln Laboratory, Lexington, Massachusetts, 1988, SPIE vol. 999 Laser Reader III, pp. 138-161.*

(Continued)

*Primary Examiner* — Luke Ratcliffe
(74) *Attorney, Agent, or Firm* — Daly, Crowley, Mofford & Durkee, LLP

(57) ABSTRACT

In one aspect, a method includes transmitting a tone waveform from a laser detection and ranging (LADAR) sensor, detecting a target using an echo of the tone waveform reflected from the target, determining a radial velocity of the target using the echo of the monotone waveform from the target, transmitting, from the LADAR sensor, linear frequency modulation (FM) chirp signals and determining a range to target using echoes from the linear FM chirp signals.

6 Claims, 10 Drawing Sheets

(56) References Cited

U.S. PATENT DOCUMENTS

| | | | |
|---|---|---|---|
| 7,684,957 B2 | 3/2010 | Ueno | |
| 7,805,082 B1 | 9/2010 | Whiteaway | |
| 7,961,332 B2 | 6/2011 | Kilpatrick et al. | |
| 7,986,397 B1 * | 7/2011 | Tiemann et al. | 356/5.09 |
| 8,487,808 B2 | 7/2013 | Boufounos et al. | |
| 2003/0011780 A1 | 1/2003 | Dalhoff | |
| 2003/0030882 A1 | 2/2003 | Garrett et al. | |
| 2003/0075677 A1 | 4/2003 | Halmos | |
| 2005/0051713 A1 | 3/2005 | Halmos | |
| 2005/0099634 A1 | 5/2005 | Dubois et al. | |
| 2005/0237533 A1 | 10/2005 | Lal et al. | |
| 2006/0061753 A1 | 3/2006 | Harris et al. | |
| 2006/0079773 A1 | 4/2006 | Mourad et al. | |
| 2006/0202885 A1 | 9/2006 | Chen | |
| 2007/0166049 A1 | 7/2007 | Pearson et al. | |
| 2009/0216093 A1 | 8/2009 | Sebastian et al. | |
| 2009/0237292 A1 | 9/2009 | Tigrek et al. | |
| 2009/0304393 A1 | 12/2009 | Kawanishi et al. | |
| 2010/0014567 A1 | 1/2010 | Yamamoto | |
| 2010/0102203 A1 | 4/2010 | Grund | |
| 2011/0299849 A1 | 12/2011 | Klotz et al. | |
| 2013/0104661 A1 | 5/2013 | Klotz et al. | |
| 2013/0148095 A1 | 6/2013 | Coda et al. | |
| 2013/0148103 A1 | 6/2013 | Halmos et al. | |
| 2013/0188167 A1 | 7/2013 | Halmos et al. | |

FOREIGN PATENT DOCUMENTS

| | | |
|---|---|---|
| JP | 2000/065923 | 3/2000 |
| JP | 2004/309367 | 11/2004 |
| JP | 2006/329829 | 12/2006 |
| WO | WO 95/15503 | 6/1995 |
| WO | WO 2004 034530 | 4/2004 |
| WO | WO 2010 086044 | 8/2010 |

OTHER PUBLICATIONS

A.L. Kachelmyer, "Spectrogram Processing of Laser Vibration Data," SPIE vol. 1936 Applied Laser Radar Technology (1993), p. 78-89.*

Matthew P. Dierking and Bradley D. Duncan, "Periodic, pseudonoise waveforms for multifunction coherent ladar," Applied Optics, vol. 49, No. 10, Apr. 1, 2010, p. 1908-1922.

Monica L. Minden et al., "A Range-Resolved Doppler Imaging Sensor Based on Fiber Lasers," IEEE Journal of Selected Topics in Quantum Electronics, vol. 3, No. 4, Aug. 1997, p. 1080-1086.

U.S. Appl. No. 13/324,162, filed Jan. 13, 2011, entitled Range-Resolved Vibration Using Large Time-Bandwidth Product Ladar Waveforms, Halmos et al. 27 pages.

U.S. Appl. No. 13/324,155, filed Jan. 13, 2011, entitled Doppler Compensation for a Coherent Ladar, Coda et al., 21 pages.

EP Search Report for Application No. 12160148.8-220 dated Feb. 1, 2013, 8 pages.

Kachelmyer et al.; "Laser Vibration Sensing", The Lincoln Laboratory Journal, vol. 8, No. 1, Jan. 1, 1995, 26 pages, XP55041316, ISSN: 0898-4130.

Kachelmyer; "Inverse Synthetic Aperture Radar (ISAR) Image Processing", Proceedings of SPIE, Jun. 1, 1992, pp. 193-205, XP55041385, ISSN: 0277-786X, DOI: 10.1117/12.59222.

Sturm et al.; "A Technique for Removing Platform Vibration Noise from a Pulsed Ladar Vibration Sensor", Optics and Laser Technology, Elsevier Science Publishers BV., Amsterdam, NL, vol. 27, No. 5, Oct. 1, 1995, pp. 343-350, XP004026187, ISSN: 0030-3992, DOI: 10.1016/0030-3992(95)98695-0.

U.S. Appl. No. 13/353,854, filed Jan. 9, 2012, Halmos.

U.S. Appl. No. 13/324,162, filed Dec. 13, 2011, Halmos et al.

U.S. Appl. No. 13/324,155, filed Dec. 13, 2011, Coda et al.

Response to Office Action in European Patent Application No. 12182615.0 filed on Jul. 17, 2013, 12 pages.

European Search Report dated Apr. 17, 2013 for EP Application No. 12/182,615 6 pages.

Ling, H., "Exploitation of Microdoppler and Multiple Scattering Phenomena for Radar Target Recognition," Office of Naval Research, Research Grant N00014-03-1-0021 Oct. 1, 2002 through May 31, 2006 (Aug. 24, 2006).

Schneider, Richard; Peter Thurmel; Michael Stockmann. "Distance Measurement of Moving Objects by Frequency Modulated Laser Radar." Opt. Eng. 40(1), 33-37 (Jan, 7, 2001).

Response to Office Action filed by Foreign Associate dated Dec. 19, 2013, for EP Application No.: 1215997.6-1811, filed on Mar. 16, 2012, 4 pgs.

Office Action dated Dec. 6, 2013, for U.S. Appl. No. 12/285,821, filed Oct. 31, 2011, 25 pgs.

The American Heritage Dictionary of the English Language, Fourth Edition. 2000. Houghton Mifflin Company. Updated in 2009. "The Free Dictionary: deterministic", http://thefreedictionary.com/deterministic 2 pgs.

Office Action dated Nov. 26, 2013 for U.S. Appl. No. 13/324,162, filed Dec. 13, 2011, 13 pgs.

Office Action dated Nov. 13, 2013 for U.S. Appl. No. 13/706,746, filed Dec. 6, 2012, 13 pgs.

Response filed by Foreign Associate dated Dec. 27, 2013 for EP Appl. No. 12161856.5, 12 pgs.

Response filed by Foreign Associate dated Dec. 18, 2013 for EP Appl. No. 12160148.8, 13 pgs.

Extended European Search Report dated Feb. 22, 2013; for EP Appl. No. 12159971.

Notfication of Transmittal of The International Search Report & The Written Opinion of the ISA (Including The ISR & WO of the International Searching Authority), dated Jan. 20, 2014 for International Appl. No. PCT/US2013/062524, 15 pages.

Magee et al., "Bistatic Coherent Laser Radar Performance," Geoscience and Remote Sensing Symposium Proceedings, Jul. 1998, 3 pages.

Ostermeyer et al., "0.5 J Frequency Stabilized Diode Pumped Solid State Laser for a Next Generation Lidar System, " Lasers and Electro-Optics, Conference in San Francisco, CA, May 16, 2004, 2 pages.

Office Action dated Nov. 27, 2013 for U.S. Appl. No. 13/324,155, filed Dec. 13, 2011, 11 pages.

Welsh et al, Bistatic Imaging lidar Technique for Upper Atmospheric Studies, Jan. 1989, Applied Optics, vol. 28, issue 1, pp. 82-88.

Whiteman et al, Raman Airborne Spectroscopic Lidar (RASL) Final Report, Sep. 2002, NASA pub.

Extended European Search Report dated Dec. 28, 2012 for EP Application No. 12161856.5-1248 43 pages.

Office Action from Foreign Associate dated Aug. 13, 2013; for EP Application No. 12161856.5-1811 filed Jul. 27, 2013 4 pages.

Office Action from Foreign Associate dated Jul. 2, 2013; for EP Application No. 12159971.6-1811 filed Jun. 24, 2013 4 pages.

* cited by examiner

Single Rep. Matched Filter

| | | | | | | | | | |
|---|---|---|---|---|---|---|---|---|---|
| kn+1 | kn+2 | kn+3 | • | • | • | • | • | • | kn+n |
| • | • | • | • | • | • | • | • | • | • |
| • | • | • | • | • | • | • | • | • | • |
| • | • | • | • | • | • | • | • | • | • |
| • | • | • | • | • | • | • | • | • | • |
| • | • | • | • | • | • | • | • | • | • |
| 3n+1 | 3n+2 | 3n+3 | • | • | • | • | • | • | 3n+n |
| 2n+1 | 2n+2 | 2n+3 | • | • | • | • | • | • | 2n+n |
| n+1 | n+2 | n+3 | • | • | • | • | • | • | n+n |
| 1 | 2 | 3 | • | • | • | • | • | • | n |

Range Bin 1 Samples, Range Bin 2 Samples, Range Bin 3 Samples, ..., Range Bin n Samples

USING MULTIPLE WAVEFORMS FROM A COHERENT LADAR FOR TARGET ACQUISITION

BACKGROUND

A laser detection and ranging (LADAR) sensor, sometimes referred to as laser radar, uses laser beams to measure distances (or ranges) and instantaneous velocities. The LADAR sensor can be used to form images of scenes with a high degree of definition (e.g., 15 cm or better resolution at ranges greater 1,000 meters). LADARs may be mounted on stationary objects and on vehicles such as helicopters, for example.

SUMMARY

In one aspect, a method includes transmitting a tone waveform from a laser detection and ranging (LADAR) sensor, detecting a target using an echo of the tone waveform reflected from the target, determining a radial velocity of the target using the echo of the monotone waveform from the target, transmitting, from the LADAR sensor, linear frequency modulation (FM) chirp signals and determining a range to target using echoes from the linear FM chirp signals.

In another aspect, an article includes a non-transitory machine-readable medium that stores executable instructions. The instructions cause a machine to transmit a tone waveform from a laser detection and ranging (LADAR) sensor, detect a target using an echo of the tone waveform reflected from the target, determine a radial velocity of the target using the echo of the monotone waveform from the target, transmit, from the LADAR sensor, linear frequency modulation (FM) chirp signals and determine a range to target using echoes from the linear FM chirp signals.

In a further aspect, an apparatus includes circuitry to transmit a tone waveform from a laser detection and ranging (LADAR) sensor, detect a target using an echo of the tone waveform reflected from the target, determine a radial velocity of the target using the echo of the monotone waveform from the target, transmit, from the LADAR sensor, linear frequency modulation (FM) chirp signals and determine a range to target using echoes from the linear FM chirp signals.

DESCRIPTION OF THE DRAWINGS

FIG. 9 is a diagram of the time samples organized into respective range bins.

DETAILED DESCRIPTION

Described herein are techniques to detect a target. Other techniques described herein determine the target's center of mass (or average) radial velocity (Doppler) and range distance from a LADAR sensor.

Figure 1:
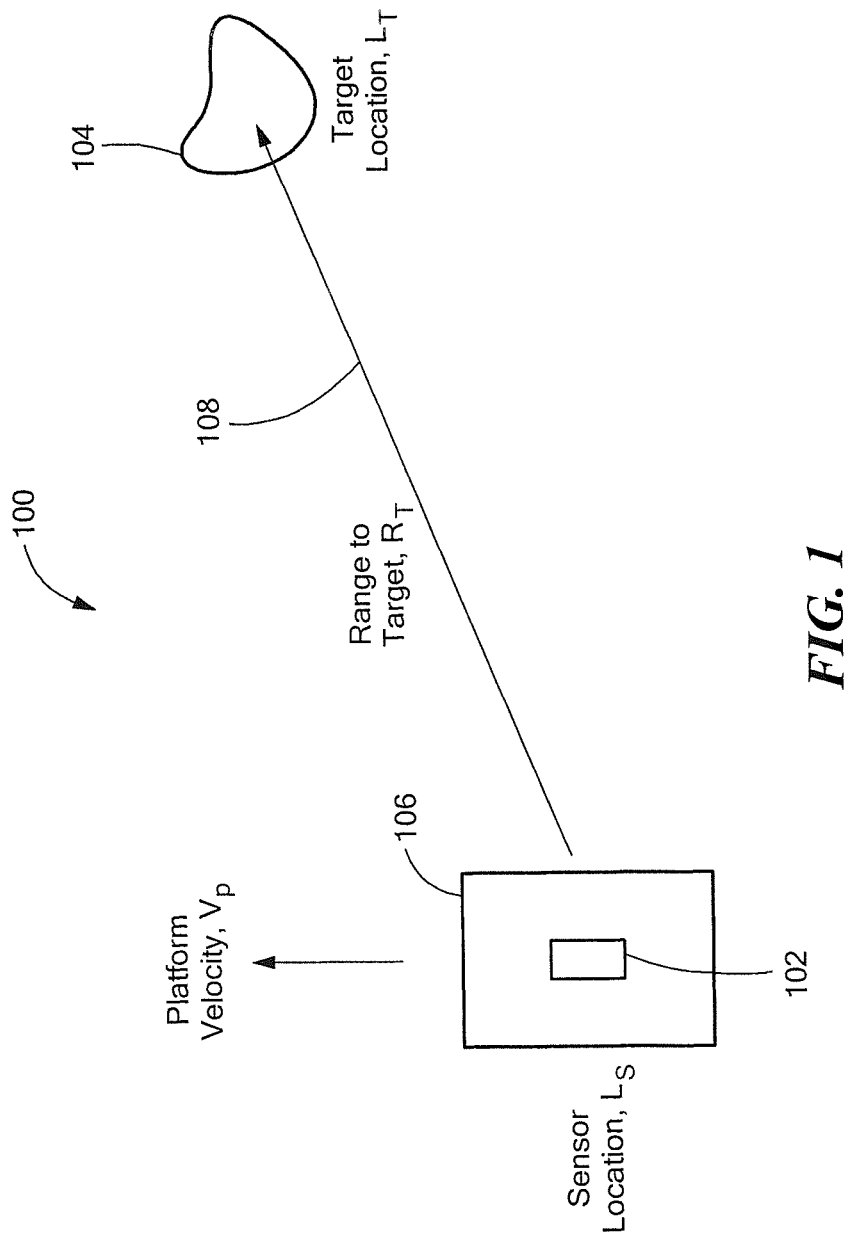
FIG. 1 is a block diagram of a laser detection and ranging (LADAR) environment.

Referring to FIG. 1, a LADAR environment 100 includes a LADAR sensor 102 at a location, $L_S$, to detect a target 104 at a location, $L_T$ with a range to target, $R_T$. The range to target, $R_T$, is a length of a vector 108 pointing from the LADAR sensor 102 to the target 104. The LADAR sensor 102 is disposed on a sensor platform 106 (e.g., a vehicle such as a helicopter) traveling at a velocity, $V_P$.

The LADAR sensor 102 transmits a signal (waveform) and the signal reflects off the target back to the LADAR sensor 102. Typically the received signal is the same waveform as the transmitted signal but shifted in time and frequency (Doppler).

Figure 2:
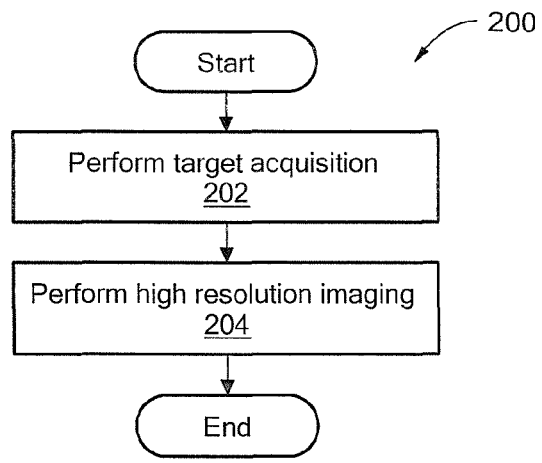
FIG. 2 is a flowchart of an example of a process to perform LADAR processing.

Referring to FIG. 2, coherent LADAR applications typically require some high resolution of mapping target Doppler information against range to create enhanced imaging functions. These functions usually require high time-bandwidth waveforms to perform synthetic aperture or inverse synthetic aperture imaging, range-resolved Doppler or vibration imaging, and so forth. In order for the LADAR function to be performed efficiently, the target center of mass Doppler and range must be determined with reasonably high accuracy. In order to accomplish this, a process 200, an example of LADAR processing, performs target acquisition 202 first and then performs a high resolution imaging 204.

Figure 3:
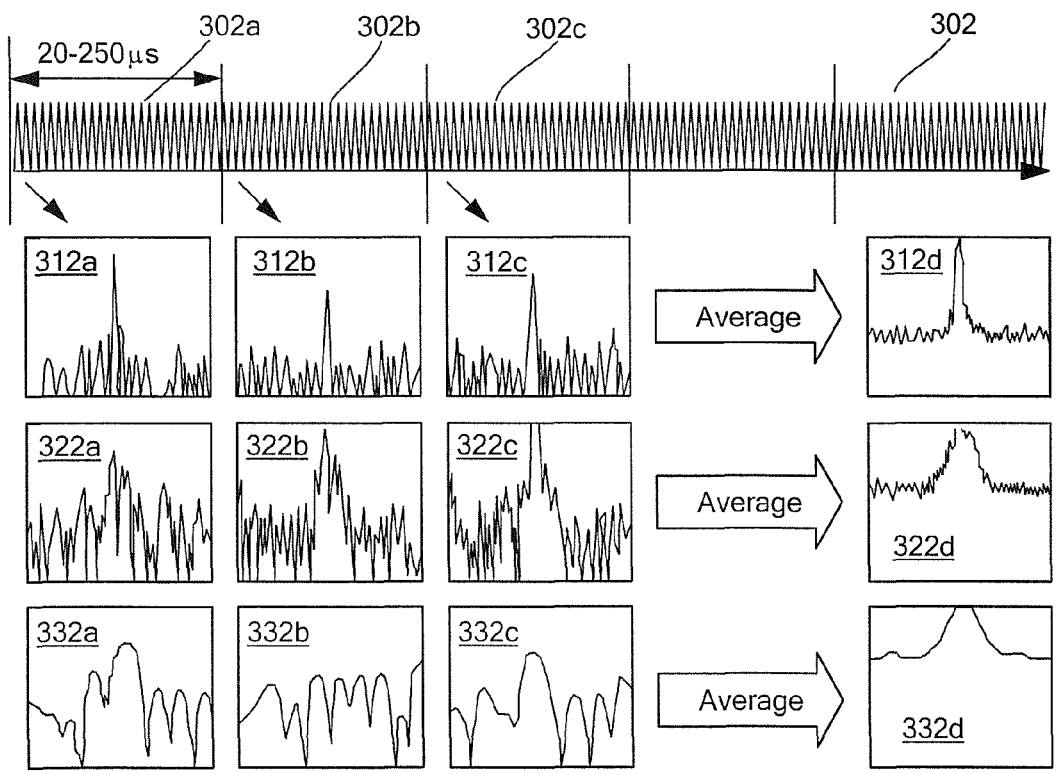
FIG. 3 is a series of graphs that includes a tone and corresponding Fourier Transforms.

Referring to FIG. 3, in the acquisition phase, the target at range is detected and the Doppler shift of the target is determined using a tone waveform. In one example, a single tone 302 is divided into a series of $T_{CIT}$', coherent integration time signals of 50 to 250 microseconds in length with a carrier-to-noise ratio (CNR) of 20 dB for a coherent integration time, $T_{CIT}$, of 250 microseconds.

The signals 312a-312c are Fourier Transforms for the signals 302a-302c, respectively with a coherent integration time, $T_{CIT}$, of 250 microseconds and a speckle bandwidth of 1.2 kHz. The Fourier Transforms 312a-312c are averaged over a period of about 10 milliseconds to form the average Fourier Transform 312d.

The signals 322a-322c are Fourier Transforms for the signals 302a-302c, respectively with a coherent integration time, $T_{CIT}$, of 250 microseconds and a speckle bandwidth of 12 kHz. The Fourier Transforms 322a-322c are averaged over a period of about 10 milliseconds to form the average Fourier Transform 322d.

The signals 332a-332c are Fourier Transforms for the signals 302a-302c, respectively with a coherent integration time, $T_{CIT}$, of 50 microseconds and a speckle bandwidth of 12 kHz. The Fourier Transforms 332a-332c are averaged over a period of about 10 milliseconds to form the average Fourier Transform 332d.

Thus, using the longer coherent integration time $T_{CIT}$, (e.g., about 250 microseconds) and then averaging for 10 milliseconds is the same or better than using a shorter coherent integration time (e.g., about 50 microseconds) and average for the same dwell time of 10 milliseconds.

Figure 4:
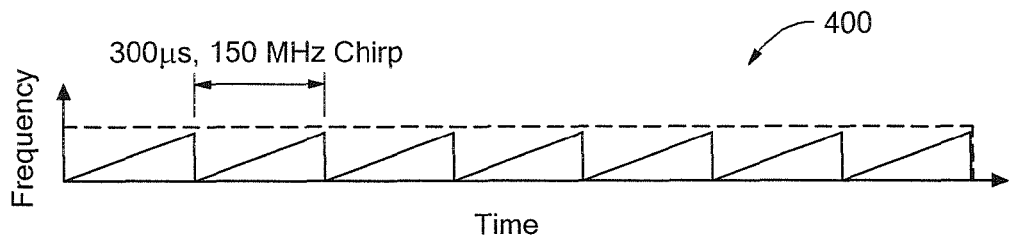
FIG. 4 is a graph of frequency versus time of an example of a chirp waveform.

Referring to FIG. 4, after the target at range is detected and the Doppler shift of the target is determined, a course range is determined by using an initial linear frequency modulation (FM) chirped waveform. For example, to have a range resolution of about 15 meters requires a chirp bandwidth of about 10 MHz since range resolution is equal to the speed of light divided by two times the chirp bandwidth. The slope of the linear chirp is the chirp bandwidth divided by the target coherent integration time or 10 MHz divided by 20 microseconds or 0.5 MHz/microsecond. An initial linear FM chirped waveform 400 has a chirp time, $T_C$, of 300 microseconds yielding a range ambiguity of 45 km and requiring a chirp bandwidth of 150 MHz.

Subsequent linear FM chirped waveforms are transmitted to reduce the range ambiguity. For example, by varying the chirp repetition rate (chirp time or chirp period), residual range ambiguities are removed in the search space and ensures that the target will not be masked by an expected optical backscatter signal. For example, transmitting a second linear FM chirp with a chirp time reduced to 250 microseconds and keeping the chirp slope the same, the unambiguous distance increases to 225 km. Transmitting a third linear FM chirp with a chirp time reduced to 200 microseconds will increase the unambiguous distance even further.

However, even if a longer unambiguous distance is not required, a third waveform ensures that at least two of the three dim reflections of the waveforms from a target are detected, because there is typically signal masking due to relatively large backscatter signal from the exit optics. This assumes that the target would be dimmer than a possible backscatter signal from the exit optics or clutter near the exiting aperture (due to aerosols, bugs, dirt, and so forth). Due to the ambiguity, a return of a nearly zero range distance could overlap with the target return at some long distance, therefore making the target undetectable.

In another example, the slope is varied while the chirp time is kept constant. This example also helps in avoiding backscatter masking.

Figure 5A:
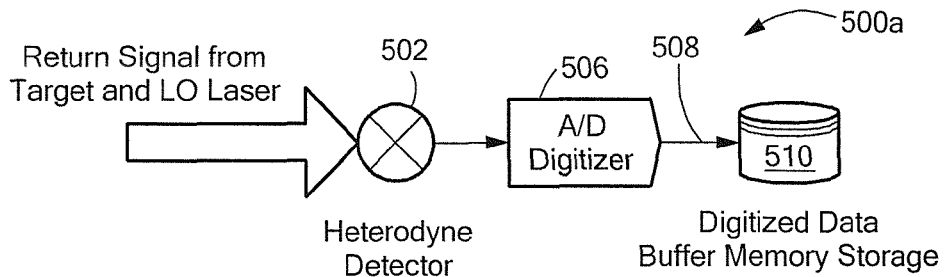
FIG. 5A is a flow diagram of an example of receiver hardware used to collect and digitize a return signal.
Figure 5B:
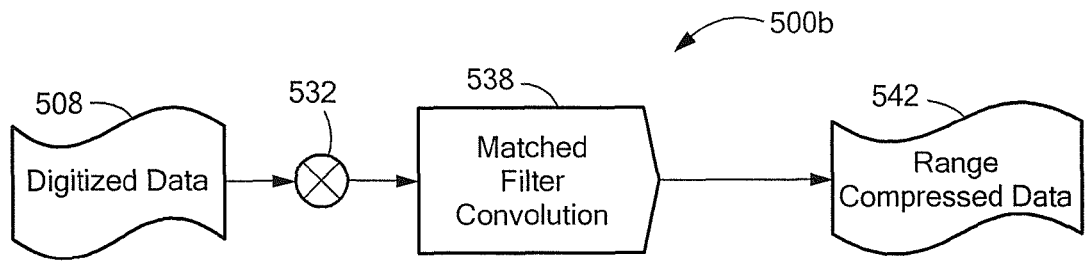
FIG. 5B is a flow diagram of an example of a process performed by the receiver hardware of FIG. 5A.
Figure 5C:
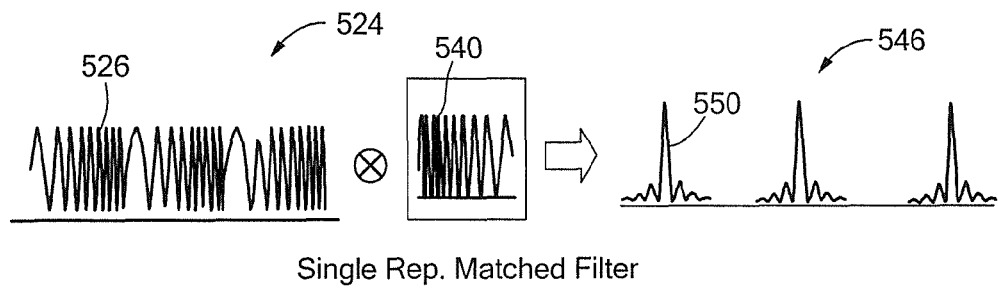
FIG. 5C is a diagram of example waveforms used in the flow diagram of FIG. 5B.

FIGS. 5A to 5C show a LADAR receiver hardware 500a and processing 500b performed at the LADAR receiver hardware 500a. At the input of the receiver hardware 500a, the return signal from the target is heterodyned using a heterodyne detector 502 (i.e., converted by mixing with a reference optical signal, the Local Oscillator, (e.g., an optical signal in the 200 THz region to the radio frequency (RF) region around 100 MHz of the received signal)). The RF analog signal is digitized by an analog-to-digital converter, A/D, 506 creating a digital data stream, 508, that is stored in a buffer memory 510. The stored data is a digital representation of the analog LADAR return from a target, and is captured in the memory storage, where the digital processing begins for determining the ranged-resolved vibration image.

Since the signal transmitted by the LADAR sensor 102 is a coherent train of repeating subsignals, the digitized return signal 508 is a digital coherent train of repeating subsignals. An example of the digitized return signal is a digitized return signal 524 for a tone waveform, which includes coherent subsignals 526. A process 500b uses a matched filter convolution 538 on the repeating pattern 526 of the waveform 524 stored as raw data 508 in the memory buffer 510.

The mixed signal from a mixer 532 is processed by the matched filter convolution 538. When a repetitive component is used to create a waveform, such as the train of coherent subsignals (e.g., a train of coherent pulses, a train of coherent chirps), a matched filter corresponds to the repeating component of the waveform. For example, the matched convolution filter 538 includes a matched signal of a single coherent subsignal, for example, a matched signal 540. The output of the matched convolution filter 538 is a train of compressed pulses or range compressed data 542 such as a signal 546 with compressed pulses 550.

Figure 6:
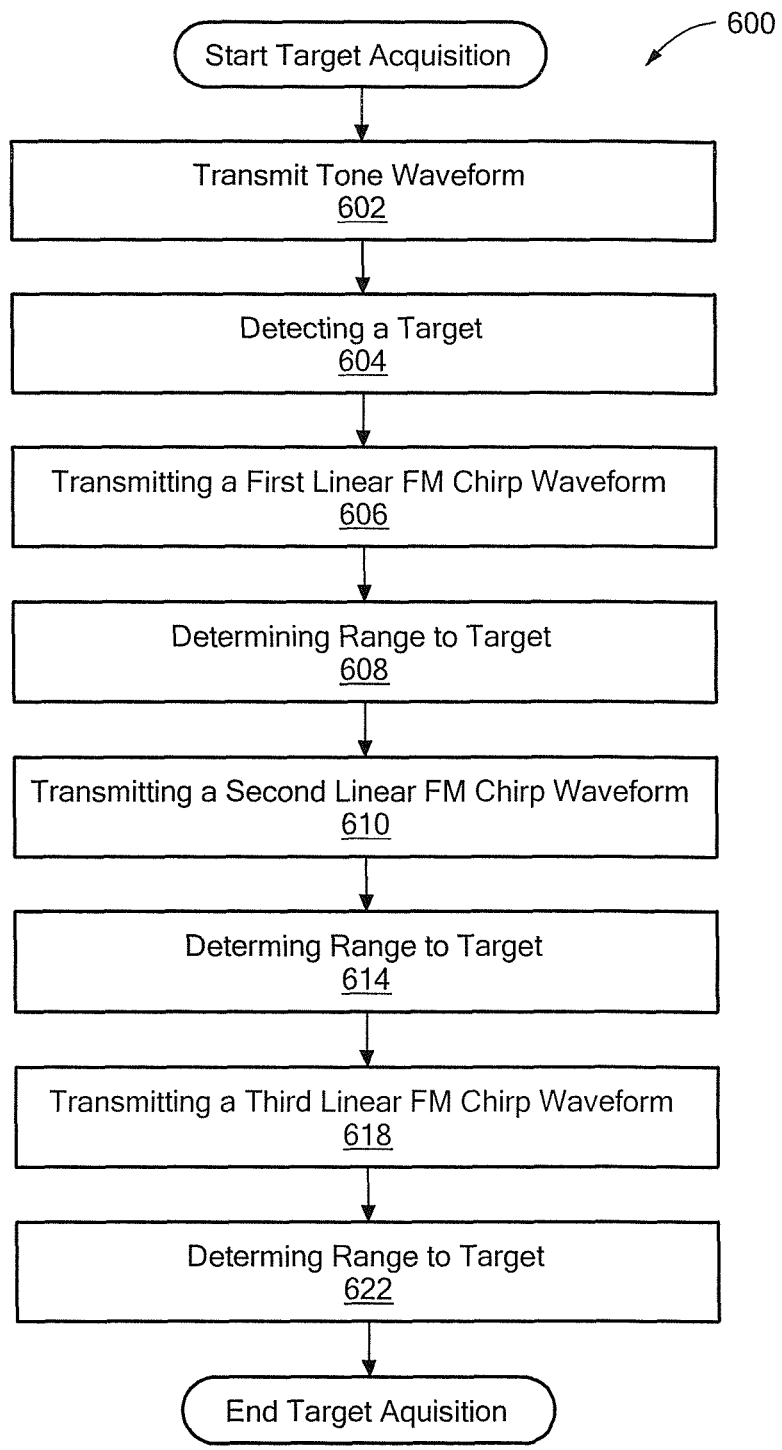
FIG. 6 is a flow chart of an example of a process to perform target acquisition.

Referring to FIG. 6, an example of a process to perform target acquisition is a process 600. Process 600 transmits a tone waveform (602) and detects a target from an echo of the transmitted tone waveform reflected from the target (604). For example, the LADAR sensor 102 transmits a tone to the target 104.

Process 600 transmits a first linear FM chirp waveform (606) and determines a range to target from an echo of the first linear FM chirp waveform from the target (608). For example, the LADAR sensor 102 transmits the first linear FM waveform to the target 104.

Process 600 transmits a second linear FM chirp waveform (610) and determines a range to target from an echo of the second linear FM chirp waveform reflected from the target (614). For example, the LADAR sensor 102 transmits the second linear FM waveform to the target 104. In one example, the second linear FM chirp waveform has the same chirp slope as the first linear FM waveform but has a different chirp time than the first linear waveform.

Process 600 transmits a third linear FM chirp waveform (618) and determines a range to target from an echo of the third linear FM chirp waveform reflected from the target (622). For example, the LADAR sensor 102 transmits the third linear FM waveform to the target 104. In one example, the second linear FM chirp waveform has the same chirp slope as the first and second linear FM waveforms but has a different chirp time than the first or second linear FM waveforms.

After target acquisition has been performed, high resolution imaging may be performed for example to determine a vibration spectrum of the target. In order to measure the vibration spectrum from a target, a series of precise instantaneous velocity or Doppler measurements are made. Each of these Doppler measurements will required a relatively large coherent integration time to make the measurement as precise as possible. A coherent integration time, $T_{cit}$, can be anywhere from 1 microsecond to 10 millisecond, depending on the speed of the target motion and the vibration high frequency end (e.g., the maximum coherent time must be smaller than $1/(2*f_{max})$, where $f_{max}$ is the maximum vibration frequency). On the other hand, in order to have reasonable range resolution (e.g., on the order of 15 cm), time precision in the neighborhood of 1 ns or less is required, which translates into a bandwidth, BW, of about 1 GHz. Using this bandwidth, and a typical coherent time of 20 µs, the time bandwidth product, BT, of such a waveform would be:

$$BT = T_{cit} \times BW = 20 \text{ µs} \times 1 \text{ GHz} = 20,000,$$

which, if greater than 100, would be considered a large time-bandwidth product waveform.

Figure 7A:
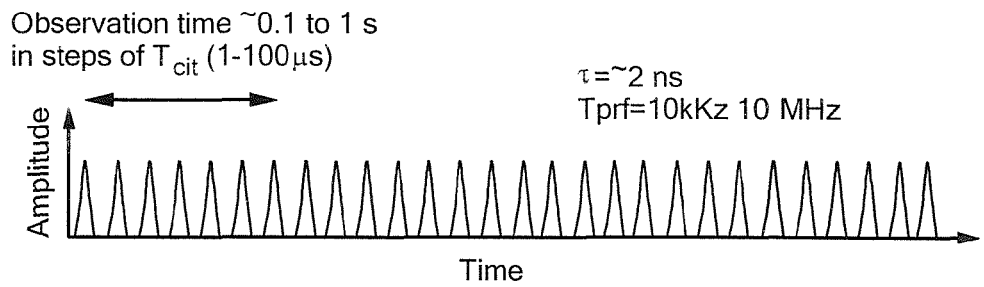
FIG. 7A is a graph of amplitude versus time of a pulse waveform.
Figure 7B:
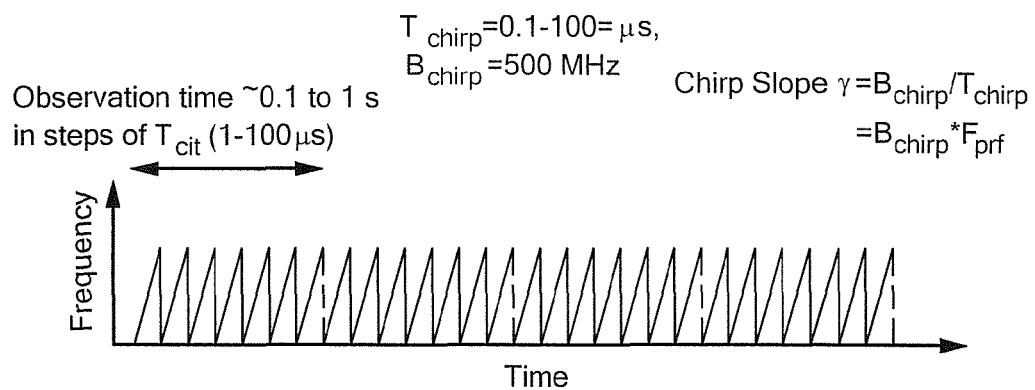
FIG. 7B is a graph of frequency versus time of a linear frequency modulation (LFM) chirp waveform.

Referring to FIGS. 7A and 7B, there are multiple ways of achieving a large BT product waveform. In particular, the large BT product waveform includes a train of coherent subsignals (patterns). In one example, as shown in FIG. 2A, a train of coherent pulses may be used. The bandwidth is achieved in the coherent pulse case by having the individual pulsewidths be about 1/BW. In FIG. 7A, the bandwidth, BW, for 2 ns is 500 MHz and the coherent processing time is set to 25 microseconds, $T_{cit}$. In this case the pulse spacing was set to a 20 nanoseconds period yielding a 50 KHz pulse repetition rate (PRF).

In another equivalent example, as shown in FIG. 7B, a train of a train of coherent linear frequency modulation (LFM) chirps may be used. The bandwidth is achieved in the chirp case, by sweeping the bandwidth at each individual chirp. In the example depicted in FIG. 2B, the bandwidth is also set to 500 MHz and the coherent processing time to 25 microseconds, $T_{cit}$. Each chirp has a period, $T_{chirp}$, of 20 ns yielding also a repetition rate of 50 KHz.

The return from a target located at a single range resolution bin will generate a train of compressed pulses after the sub-apertured matched filter. The pulse spacing will be the same as the original transmitted pulse spacing. By sampling the received signal at the pulse spacing period, the signal from a given range bin is obtained. The number of different range bins that can be obtained is determined by dividing the pulse spacing (in range) by the resolution range, which is the pulse-width time c/2, where c is the speed of light. The pulse spacing determines the maximum range that is unambiguous. Returns beyond the pulse spacing would be misinterpreted as belonging to the second pulse after yielding an ambiguity that corresponds to this spacing. For example, if the pulse spacing is 10 microseconds and the resolution bins are 1 nanosecond wide, then 10,000 range bins can be obtained. Assuming that the return signal is from a heterodyne receiver, the train of pulses sample the beat frequency between the signal and the LO. Another advantage of this technique is that coherence of the target does not need to be known a priori. The pulse train can be indefinitely long, and each range bin can be sampled for a relatively long time. Various record lengths can be tried to optimize to whatever target induced loss of coherence may be. If the train of pulses is longer than the target coherence time, then the signal can be broken into components approximately as long as the coherence time, and then those components may be averaged in an incoherent way (e.g., using the magnitude only).

When using the LFM chirp, the matched filter of the repeating pattern process is referred to as the fast transform (e.g., a fast Fourier Transform) that will separate the return signal into range bins. After that separation, each single range bin is selected, and the signal is integrated for the coherent integration time, $T_{cit}$.

A matched filter in the LFM chirp can be implemented by multiplying the return by a chirp of the same slope (a process called de-chirping) followed by a Fourier Transform, which is applied to each chirp element. This generates a Fourier Transform spectrum where the frequency resolution corresponds to the range resolution given by $(c/2)*(1/BW)$ (where c is the speed of light). A specific range bin is selected, and all the samples that each chirp pulse generates are collected. If the chirp pulses are coherent to each other, then so will be the samples across a given range bin. The samples are collected for a period corresponding to the coherent integration time, $T_{cit}$, and a second Fourier Transform is performed on that data. This second transform is referred as the slow transform (e.g., slow Fourier transform) because it uses the data collected at a longer period of time. Typically, any motion compensation would be done on the data of the slow transform. The slow Fourier transform becomes one of the frequency slices used to create a spectrogram. Since this process is done for each range bin, a spectrogram and a resulting vibration spectrum is formed for each range bin, hence the name range-resolved vibration.

Figure 8A:
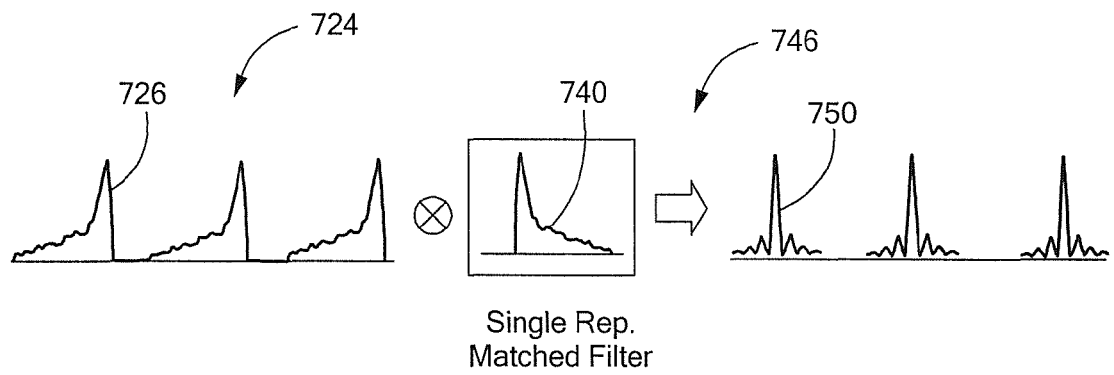
FIG. 8A is a diagram of example waveforms used in the flow diagram of FIG. 5B.

Referring to FIG. 8A, using a chirp waveform instead of a tone in FIG. 5C, an example of the digitized return signal is a digitized return signal 724, which includes coherent subsignals 726. Using a matched filter 740 on the digitized return signal 724 generates a signal 746 with compressed pulses 750.

Figure 8B:
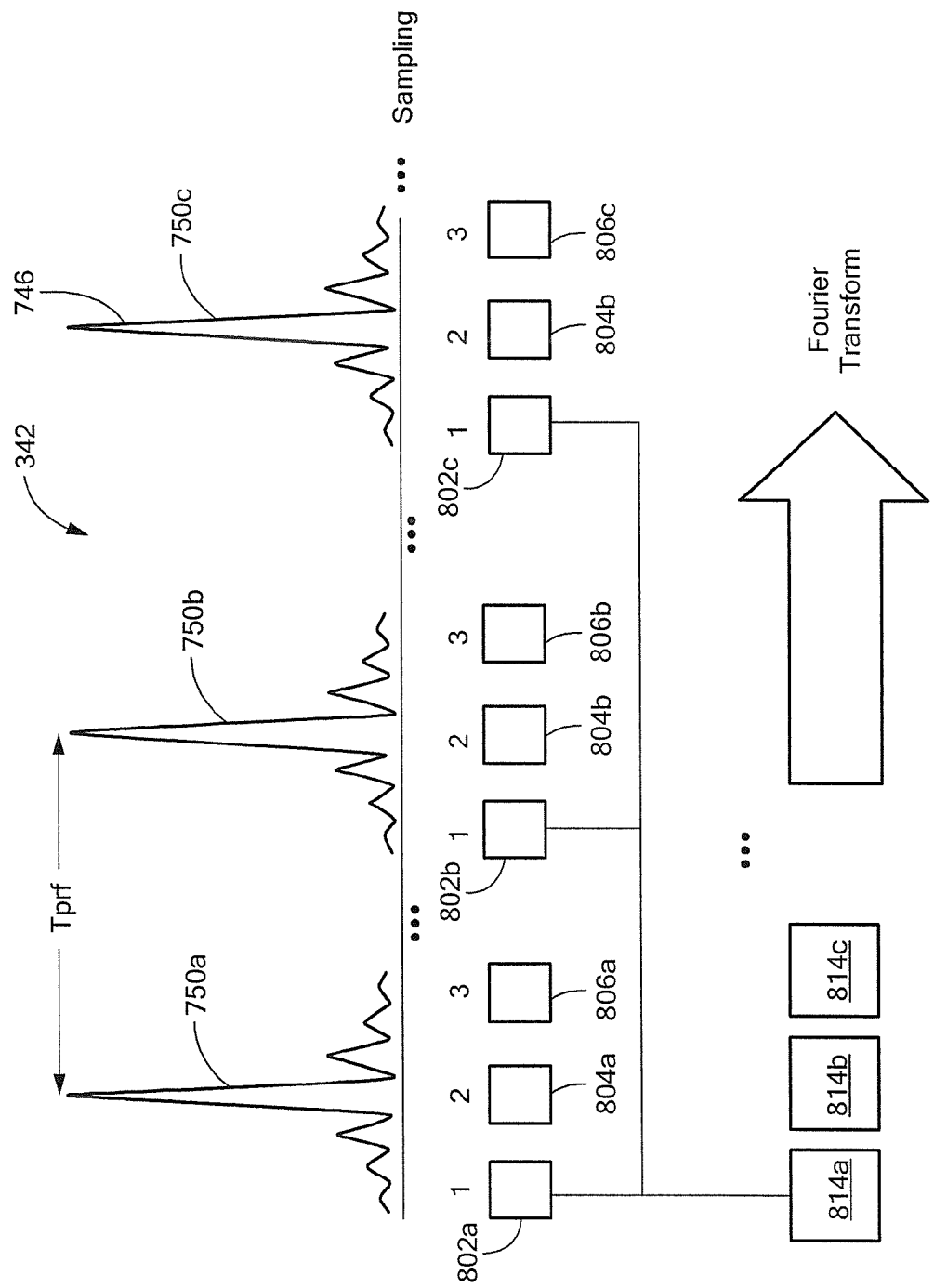
FIG. 8B is a diagram of an example of the range compressed data as a train of compressed pulses.

Referring to FIG. 8B, the compressed range data 342, for example, the train of compressed pulses 746, has a period of Tprf. The A/D sampling rate has a period of $\tau/2$. The number of samples within the repeating pattern is $n=2*Tprf/\tau$.

The train of compressed pulses 746 is used to form range bins. In particular, since the digital compressed pulses are coherent, like portions of a digital pulse are the same ranges. For example, data 802a at the beginning of a pulse 750a is the same range as data 802b at the beginning of a pulse 750b and is also the same range as data 802c at the beginning of the pulse 750c. In another example, data 804a in the middle of the pulse 750a is the same range as data 804b in the middle of the pulse 750b and is also the same range as data 804c at the beginning of the pulse 750c. In a further example, data 806a at the end of the pulse 750a is the same range as data 806b at the end of the pulse 750b and is also the same range as data 806c at the end of the pulse 750c.

The same range data is grouped together and a Fourier transform is formed on it. For example, data from 802a-802c, 804-804c and 806-806c are grouped together forming range groups 814a-814c. Each range group 814a-814c corresponds to return signals from that specific range sampled at a period of $T_{prf}$. A Fourier transform is then performed on each of the range group data.

Referring to FIG. 9, the data between time, t=0 to $T_{prf}$, is organized into bins corresponding to the n samples of the train of compressed pulses 346. The resulting row corresponds to the returns for a single range-bin sampled at a period of $T_{prf}$. FIG. 9 is based on an assumption that the observation time is selected such that there are k samples at each range bin.

Figure 10A:
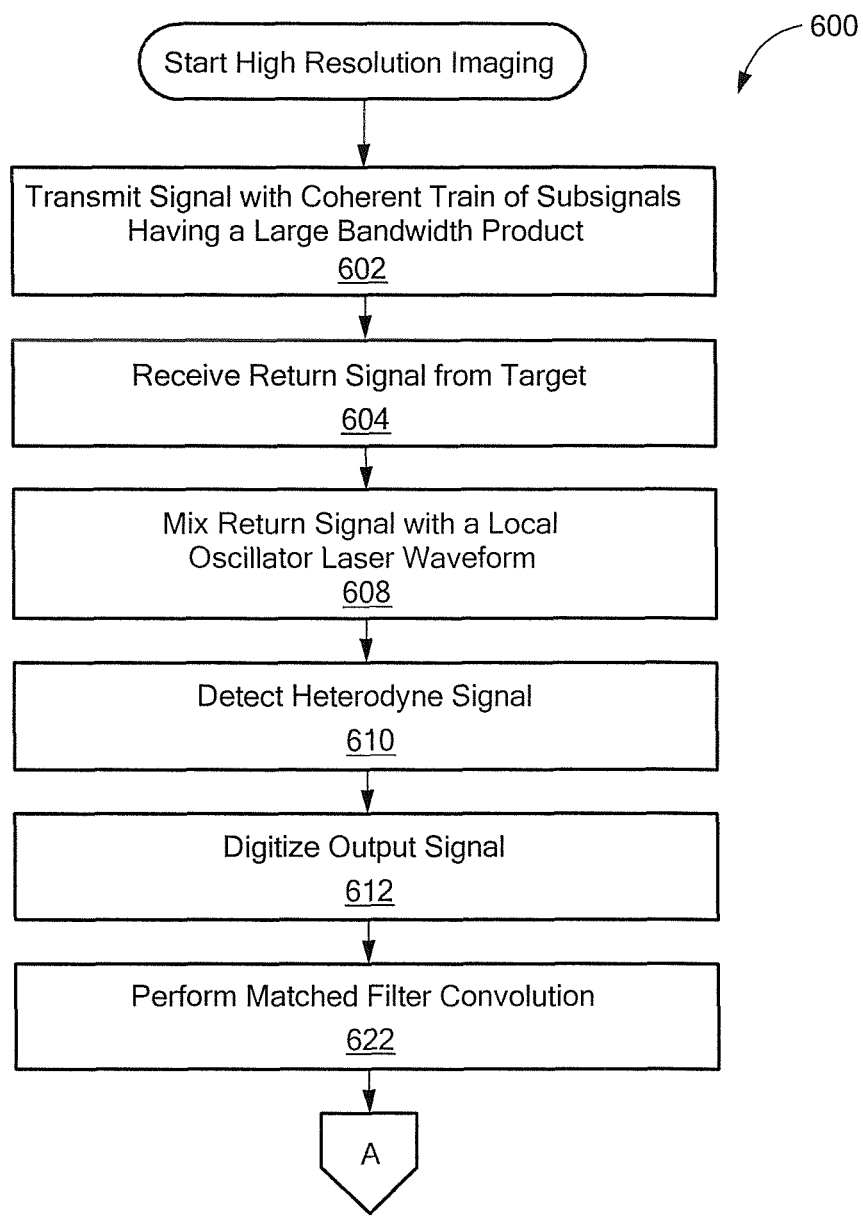
FIGS. 10A and 10B are a flowchart of an example of a process to determine range-resolved vibration.
Figure 10B:
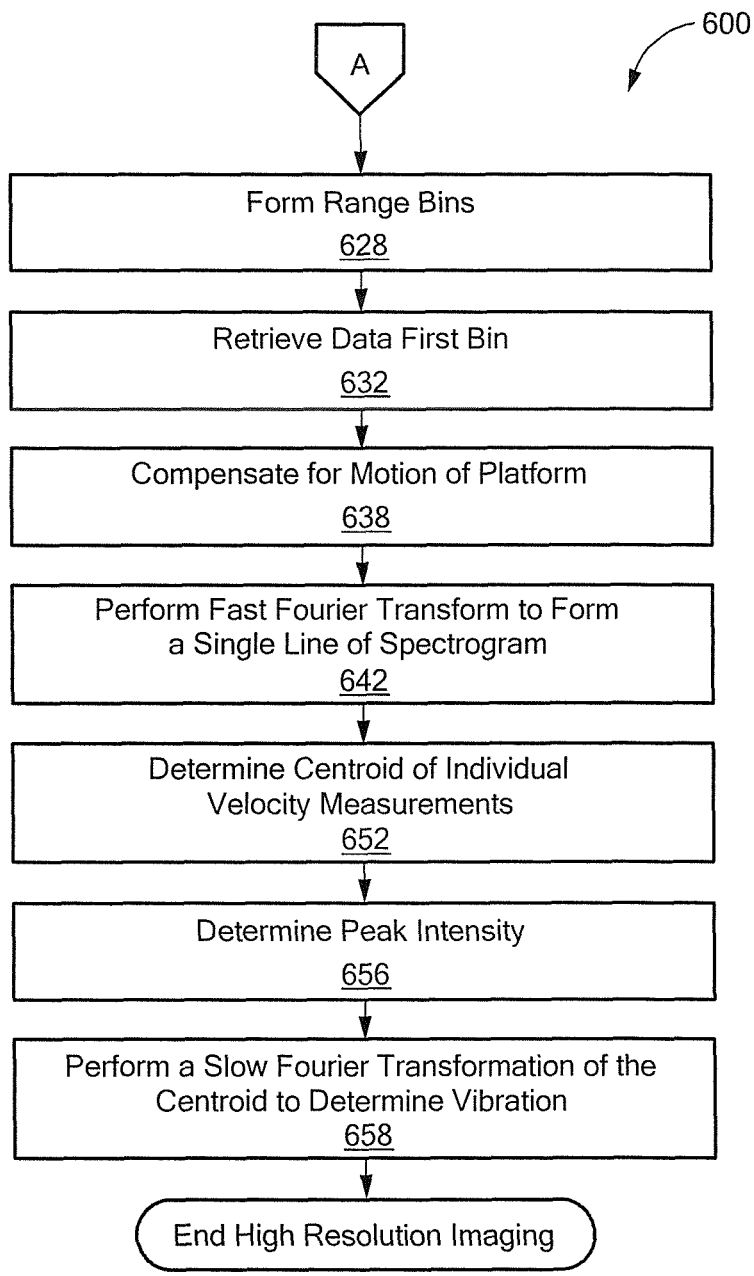

Referring to FIGS. 10A and 10B (also referred to herein collectively as FIG. 10), an example of a process to determine range-resolved vibration is a process 1000. Process 1000 transmits a signal with a coherent train of subsignals having a large bandwidth product (1002). In one example, the LADAR sensor 102 transmits a coherent train of pulses. In another example, the LADAR sensor 102 transmits a coherent train of LFM chirps. The large bandwidth product, BT, is greater than 100.

Process 1000 receives a return signal from the target (1004). For example, the LADAR sensor 102 receives the return signal reflected off the target 104. Process 1000 mixes the return signal with a Local Oscillator laser (1008), detects a heterodyne signal (1010) and digitizes the output signal (1012). For example, the heterodyne detector 502 senses the return signal that is mixed with a LO laser waveform and the output of the heterodyne detector 502 is digitized by the A/D digitizer 506.

Process 1000 performs a matched convolution (1022). For example, the output of the A/D digitizer 506 is sent to the match filter convolution 538 to form range compressed data 542, for example, a range compressed coherent pulses.

Process 1000 forms range bins (1028) and retrieves data from a first bin (1032). Process 1000 compensates for the motion of a platform (1038). For example, the phase and frequency of the heterodyne signal is adjusted to subtract the motion sensed (using other sensors) from the platform. In one example, the LADAR sensor 102 is disposed on the platform 106, which is moving.

Process 1000 performs a Fourier transform of a coherent period of data, $T_{CIT}$, to form a single line (e.g., vertical) of a spectrogram (1042).

Process 1000 continues to add vertical lines to the spectrogram for as long as the pre-determined observation time. The length of the observation time determines the frequency resolution of the resulting vibration spectrum Once the spectrogram is complete, process 1000 takes a centroid of individual velocity measurements (1052) by determining the instantaneous Doppler frequency of the peak intensity of each vertical line that represents the instantaneous velocity at that point in time. Process 1000 performs a slow Fourier transform of the centroid to determine a vibration (1058).

Upon the completion of the process 1000, a vibration and intensity is determined for each range.

Figure 11:
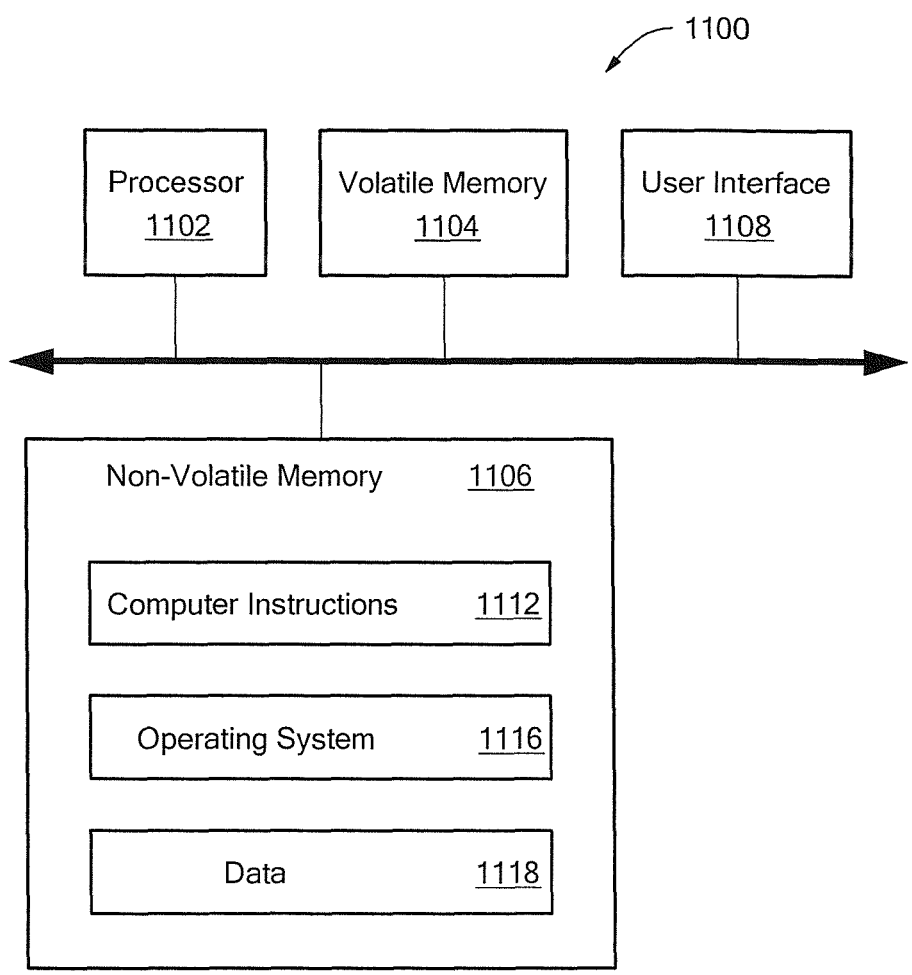
FIG. 11 is a computer on which the process of FIG. 6 and/or the process of FIGS. 10A and 10B may be implemented.

Referring to FIG. 11, a computer 1100 includes a processor 1102, a volatile memory 1104, a non-volatile memory 1106 (e.g., hard disk), a user interface (GUI) 1108 (e.g., a mouse, a keyboard, a display, for example). The non-volatile memory 1106 stores computer instructions 1112, an operating system 1116 and data 1118. In one example, the computer instructions 1112 are executed by the processor 1102 out of volatile memory 1104 to perform all or part of the processes 600 and 1000.

The processes described herein (e.g., the processes 600 and 1000) are not limited to use with the hardware and software of FIG. 11; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the processes 600 and 1000 are not limited to the specific processing order of FIGS. 6 and 10. Rather, any of the processing blocks of FIGS. 6 and 10 may be re-ordered, combined or removed, performed in parallel or in serial, as necessary, to achieve the results set forth above.

The processing blocks in FIGS. 6 and 10 associated with implementing the system may be performed by one or more programmable processors executing one or more computer programs to perform the functions of the system. All or part of the system may be implemented as special purpose logic circuitry (e.g., an FPGA (field programmable gate array) and/or an ASIC (application-specific integrated circuit)).

Elements of different embodiments described herein may be combined to form other embodiments not specifically set forth above. Other embodiments not specifically described herein are also within the scope of the following claims.

What is claimed is:

1. A method, comprising:
   transmitting a tone waveform from a laser detection and ranging (LADAR) sensor;
   detecting a target using an echo of the tone waveform reflected from the target;
   determining a radial velocity of the target using the echo of the tone waveform from the target;
   after detecting the object and determining the radial velocity, transmitting, from the LADAR sensor, linear frequency modulation (FM) chirp signals one at a time towards the target, the linear FM chirp signals differ from one another by one of chirp slope or chirp time; and
   determining a range to the target using echoes from the linear FM chirp signals.

2. The method of claim 1 wherein a number of the linear FM chirps is three.

3. The method of claim 1 wherein each of the linear FM chirp signals have different chirp times from each other and each of the linear FM chirp signals have equal chirp slopes.

4. The method of claim 1 wherein a chirp time of a second linear FM chirp signal is less than a chirp time of a first linear FM chirp signal.

5. The method of claim 1, further comprising transmitting a signal from the LADAR sensor to the target having a large time-bandwidth product to determine a vibration,
   wherein the large bandwidth product, BT, is greater than 100 and BT is equal to Tcit×BW, where BW is bandwidth and $T_{cit}$ is coherent integration time.

6. The method of claim 1 wherein each of the linear FM chirp signals have different chirp slopes from each other and each of the linear FM chirp signals have equal chirp times.

* * * * *